US006869502B2

(12) United States Patent
Csendes

(10) Patent No.: US 6,869,502 B2
(45) Date of Patent: *Mar. 22, 2005

(54) METHOD AND APPARATUS FOR SEPARATING IMPURITIES FROM A LIQUID

(75) Inventor: Ernest Csendes, Pacific Palisades, CA (US)

(73) Assignee: General Grinding Corporation, Pacific Palisades, CA (US)

( * ) Notice: Subject to any disclaimer, the term of this patent is extended or adjusted under 35 U.S.C. 154(b) by 670 days.

This patent is subject to a terminal disclaimer.

(21) Appl. No.: 09/921,408

(22) Filed: Aug. 1, 2001

(65) Prior Publication Data

US 2002/0017450 A1 Feb. 14, 2002

Related U.S. Application Data

(60) Provisional application No. 60/222,627, filed on Aug. 3, 2000.

(51) Int. Cl.$^7$ .............................................. B02C 19/12
(52) U.S. Cl. ....................... 159/6.1; 202/175; 202/182; 202/218
(58) Field of Search ................................ 202/175, 182, 202/218; 95/261; 159/6.1

(56) References Cited

U.S. PATENT DOCUMENTS

| 3,779,452 A | * | 12/1973 | Nau et al. .................... 202/205 |
| 3,957,588 A | * | 5/1976 | Humiston .................... 202/172 |
| 5,217,579 A | * | 6/1993 | Kusakabe et al. .......... 202/154 |
| 5,534,118 A | * | 7/1996 | McCutchen ................. 202/205 |
| 5,695,130 A | | 12/1997 | Csendes |
| 5,913,287 A | * | 6/1999 | Csendes .................... 122/4 D |
| 6,044,977 A | * | 4/2000 | Csendes ...................... 209/23 |
| 6,135,371 A | * | 10/2000 | Csendes ...................... 241/15 |

* cited by examiner

Primary Examiner—N. Bhat
(74) Attorney, Agent, or Firm—Edward A. Sokolski

(57) ABSTRACT

A liquid having certain undesired elements therein is distilled in a distillation column to form a vapor stream. This vapor stream is fed by means of an inert gas drive to a first container having an array of semi-permeable screens which are rotated at a speed of 3,000–10,000 rpm to generate vertical spiral vortexes which act on the vapor to separate out heavier impurities. An inert gas is employed to drive the vapor stream from the first container to the bottom of a second container having a narrower diameter array of semi-permeable screens, these screens being driven at a velocity of 6000–100,000 rpm. In the second container, the molecular species is separated from the main vapor stream by virtue of the exposure of the vapor to large centrifugal gravity forces generated by the horizontal velocity vectors of the rotating screens. The more volatile first fraction of vapor exits the column to a condenser where it is transformed to liquid form and provides the output of the system while the second less volatile fraction of the vapor is fed to the bottom of the array from where it is exited.

8 Claims, 3 Drawing Sheets

METHOD AND APPARATUS FOR SEPARATING IMPURITIES FROM A LIQUID

Application claims the priority of Provisional Application No. 60/222,627 filed Aug. 3, 2000 for this application.

BACKGROUND OF THE INVENTION

1. Field of the Invention

This invention relates to a method and apparatus for removing impurities from a liquid and more particularly to such a method and apparatus in which such impurities are removed by distilling the liquid to a vapor and feeding the vapor through arrays of rotating semi-permeable screens.

2. Description of the Related Art

Thermal separation of impurities(or non-desired components) from a liquid generally involves separation of liquids with different vapor pressures or boiling points in a distillator. The upward vapor stream in the tall separation columns of the distillator is in continuous contact with the liquid phase so that efficient mass transfer occurs. The vapor stream is isolated by exposure to a condenser and the counter-current downward flowing liquid is reheated to effect vaporization at the bottom of the column by means of re-boiler. To expose the vapor stream to large surfaces of the liquid phase, a cylindrical column of plates, trays or packings are used. Distillation involves an equilibrium stage concept wherein separation is effected by the addition or withdrawal of heat. The distillation process may be isothermal(i.e. with constant temperature but changing volume and pressure) or adiabatic(i.e. with no loss of heat.

For the separation of liquids with close boiling points or systems with low relative volatilities, enhanced separation methods have been developed which rely on additional mechanisms to further modify the vapor-liquid equilibrium. These techniques may involve azeotrope distillation, pressure swing distillation, extractive distillation, salt distillation or reactive distillation. Each of these approaches relies on the addition of differing liquids or solids or an outright chemical reaction. For the separation of complex mixtures, tall separation columns are used to provide for the efficient refluxing and stripping of the liquids to yield a purified vapor which is a fraction of a given compound.

For the separation of liquids wherein the relative volatility between the components is very large, or when partial separation is only intended, a single stage flash distillation process may be used. This process could be isothermal or adiabatic. Some higher boiling components of a mixture may exhibit volatility with aqueous steam and allow for differential distillation using the steam stripping technique.

Distillation is widely practiced in the commercial separation and purification of ingredients in petroleum crudes, plant derived oils and fats, solvents, essential oils, the cleaning of natural gas, methanol, ethanol, large scale synthetic chemical compounds and other substances. In the course of distillation in columns having multiple liquid stages, the vapor passing through the liquid has a tendency for small droplets of liquid to be entrained in the ascending vapor stream. This tendency increases as the upward velocity of the vapor stream is increased. Further the vapors of many liquid compounds contain molecular aggregates that may be formed by Van der Waals forces, associations caused by quadrupole moments or inducted polarity due to the presence of double or triple bonds in the respective molecules or ionic attractions.

The system and method of the present invention provides an improvement over the aforementioned prior art distillation techniques in providing enhanced separation of impurities from liquids that do not involve variations in temperature and pressure to achieve the desired end result. Further the system and method of the present invention is capable of separating out molecular ingredients that have small boiling point differences with the desired output liquid.

In my U.S. Pat. No. 5,695,130 issued Dec. 9, 1997, a grinding system is described in which rotating screens with wide mesh openings are first used to comminute particulate material through spiral vortexes and such comminuted material is then fed to circular vortexes formed between rotating discs and stationary plates where the final grinding of the particulate material is accomplished and the final comminuted material is separated from the gas streams by centrifugal fans.

In my U.S. Pat. No. 6,044,977 issued Apr. 4, 2000, a system and method is described utilizing an array of semi-permeable rotating screens which generate vortex zones through which gas is passed to effectively remove micro particles therefrom.

The present invention is directed to the use of such rotating screens to effectively separate out impurities from a vapor stream. Further, in the present invention by utilizing screens that rotate at high speeds and generate large centrifugal gravity forces, elements of different molecular weight or geometrical configuration can be sorted out,

SUMMARY OF INVENTION

In the system and method of the present invention a liquid with components contained therein to be separated out is first distilled to produce a vapor. The vapor is fed into a first container having an array of semipermeable screens therein, such screens being rotated at a velocity of 3,000–10,000 rpm. Vertical spiral vortexes generated by the screens separates out impurities from the vapor and splits molecular assemblies therefrom. From the first container, the vapor is fed to a second narrower diameter container which has an array of semi-permeable screens. The screens of this second container are rotated at high velocity (6000–100,000 rpm). Here, horizontal centrifugal separation is achieved with separation of molecular species in the vapor stream. The purified vapor is finally fed to a condenser which restores it to liquid form.

It is therefore an object of this invention to provide a system and method for separating out impurities from a liquid;

It is a further object of this invention to provide a more efficient and simpler system and method for separating impurities from a liquid;

It is a still further object of this invention to provide a system and method for separation out of molecular species from a liquid;

Other objects of the invention will become apparent in view of the following description taken in connection with the accompanying drawings.

DETAILED DESCRIPTION OF THE INVENTION

Figure 1:
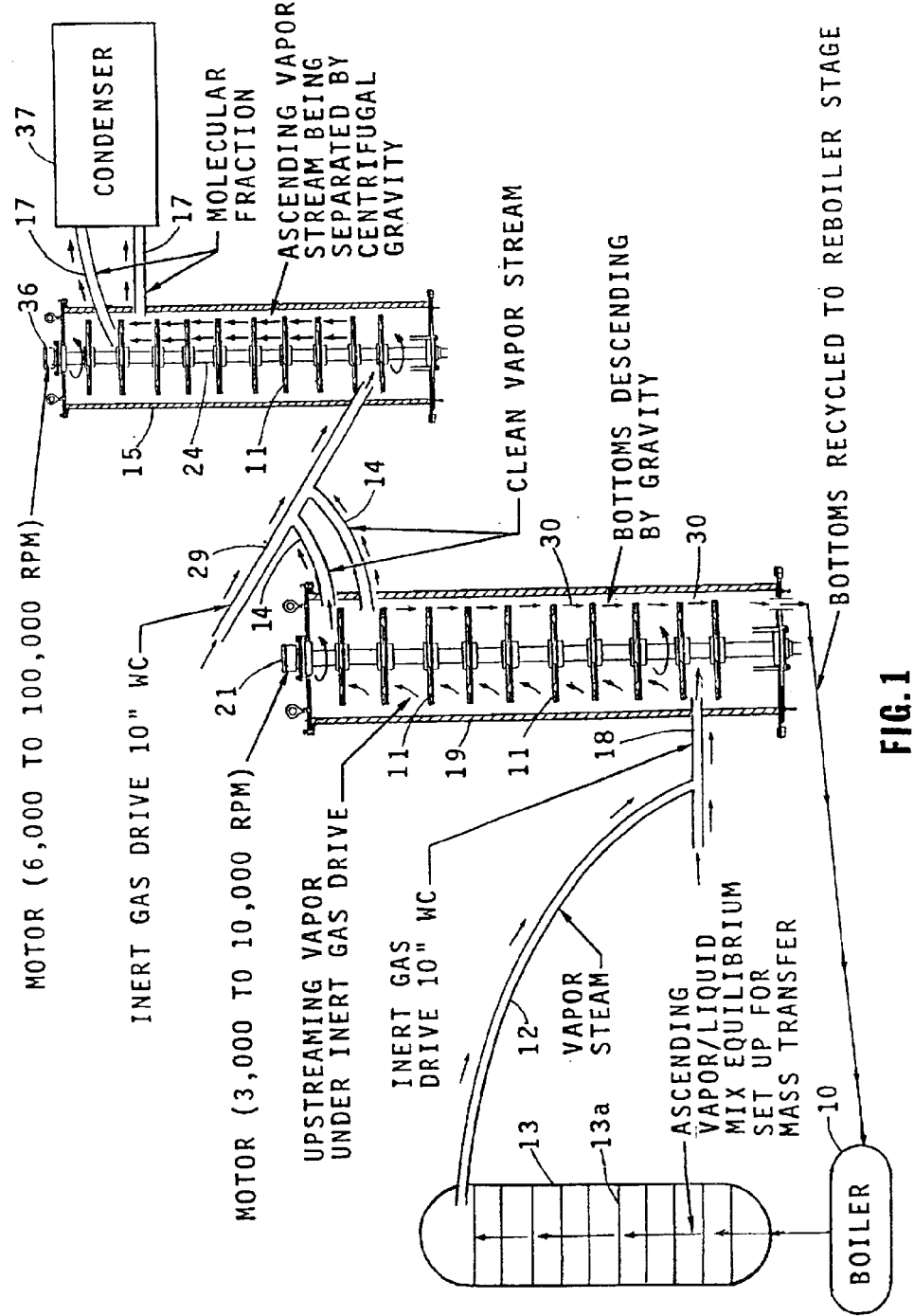
FIG. 1 is a schematic drawing illustrating the first and second containes and rotating screens for separating out impurities in the preferred embodiment of the invention.

Referring to the drawings, a preferred embodiment of the invention is illustrated.

Liquid to be purified is placed in boiler 10, vapor and liquid from boiler 10 being fed to distillation column 13 which has fractioning plates 13a therein. Distillation column 13 is a conventional such column which converts all of the liquid to vapor.

The vapor from the distillation column is transferred through line 12, by the action of an inert gas drive in line 18, to the bottom of container 19 in which an array of rotatable semi-permeable screens 11 is mounted. Separated out vapor 30 is fed out from the bottom of container 19 to boiler 10 for recycling. The screens are rotatably driven by means of motor 21 at a velocity of 3000–10,000 rpm. Vertical spiral vortices are generated by virtue of the rotation of the screens, these vortices acting on the vapor stream to separate impurities therefrom. The partially purified vapor is fed by the action of an inert gas drive 29 through lines 14 to the bottom of second container 15 for further purification. Material separated out is fed to the bottom of container 15.

Figure 2:
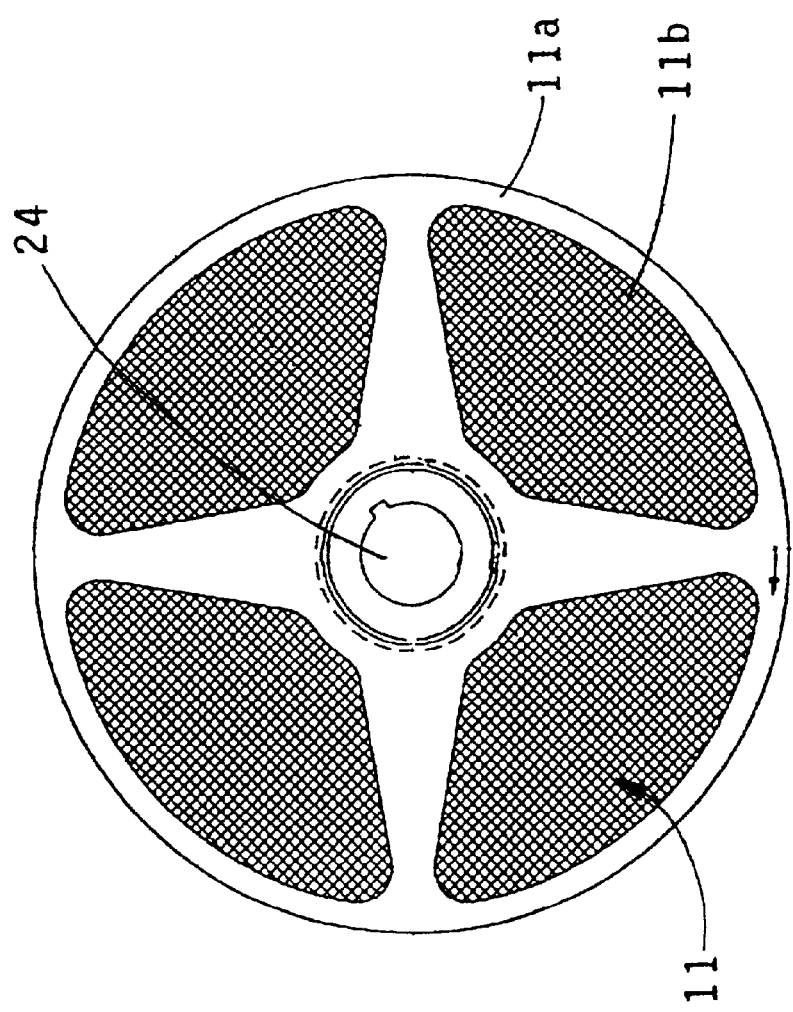
FIG. 2 is a to plan view of one of the rotating screens of the preferred embodiment.

One of the semipermeable screens is illustrated in FIG. 2. The screens have a steel holding frame 11a in which the screen 11b is mounted. Screen 11b may be in he range of 2.5–60 mesh and preferably 4–10 mesh. The screens are rotatably driven by motor 21 at 3000–10,000 rpm.

Figure 3:
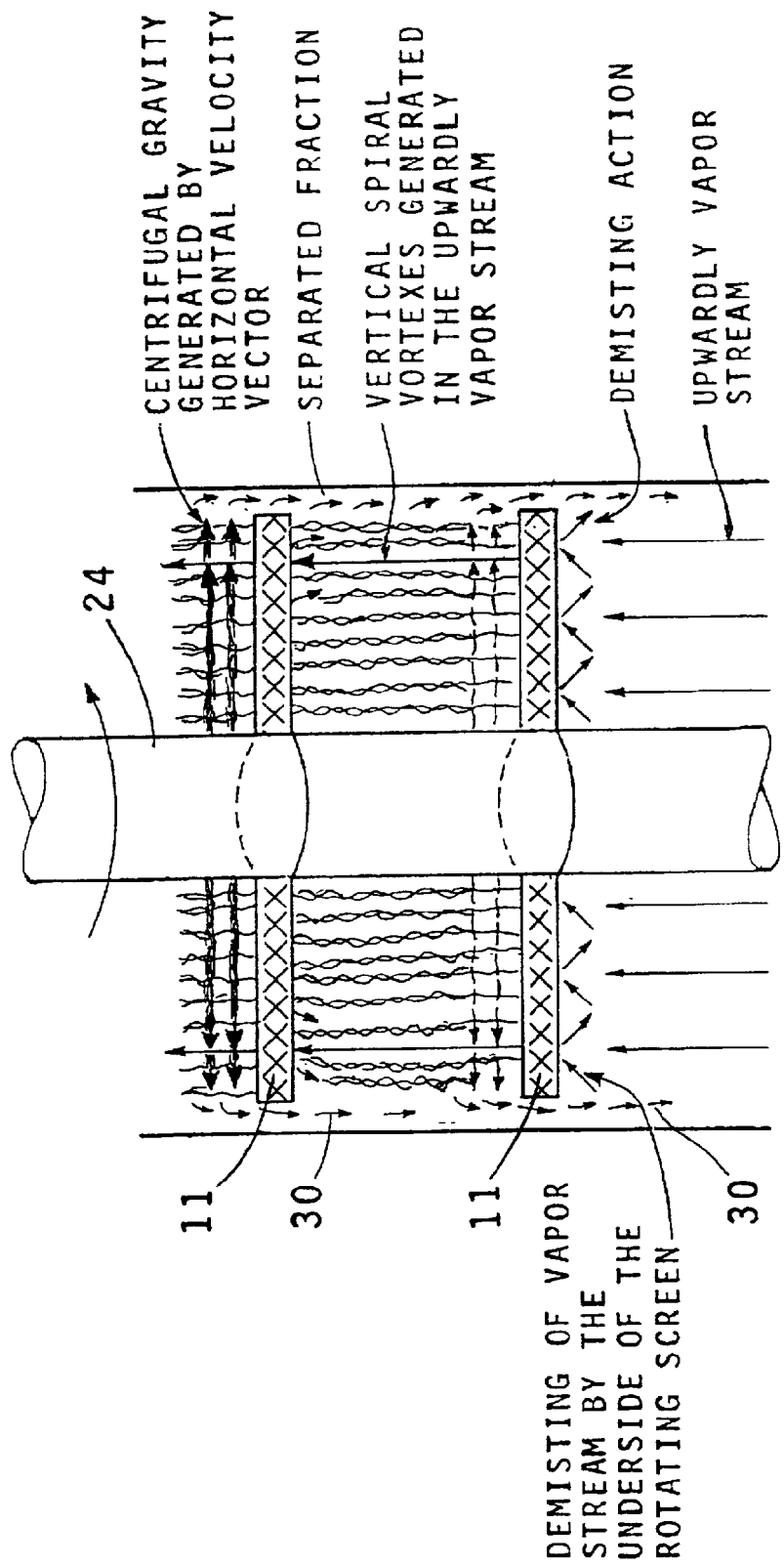
FIG. 3 is a schematic drawing illustrating the operation of the preferred embodiment.

Referring to FIG. 3, the separation operation of the rotating semi-permeable screens is illustrated. The vapor stream when it strikes the underside of the bottom rotating screen 11 is de-misted with the vapor stream itself passing through the screen. The high speed rotating screens generate centrifugal gravity by virtue of the large horizontal velocity vector which separates the varying molecular species in the upward vapor stream. The vertical velocity vector results in the generation of vertical spiral vortexes in the upwardly traveling vapor stream. The vertical spiral vortexes induce separation in the vapor stream by the addition of high kinetic energy to such vapor which is thereafter subjected to a centrifugal sorting action by the large horizontal vector. The portion of the vapor stream 30 which is separated out by the large horizontal centrifugal forces is dropped by gravity to the bottom exit 31 of the container 19 (See FIG. 1) and fed to boiler 10 for recycling.

Referring to FIG. 1, the vapor stream is outputted from container 19 through lines 14 by means of pressurized inert gas in line 29 and fed to the bottom of container 15. Container 15 has an array of semi-permeable screens 11 driven by motor 36, similar to that described in connection with container 19. The container and its driven screens differ from that of container 19 in that the diameter of container 15 is narrower and the screens are driven at the much higher speed of 6,000–100,000 rpm. The high centrifugal forces generated in container 15 represented by the high level horizontal vectors of the rotating screens acts to separate out molecular species in the vapor stream. The more volatile fraction which constitutes the purified vapor is exited from container 15 through lines 17 and fed to condenser 37 for conversion to liquid form. The less volatile fractions accumulate on the container wall and are tapped from the bottom of the container.

While the invention has been described and illustrated in detail, it is to be clearly understood that this is intended by way of illustration and example only and not by way of limitation, the scope of the invention being limited only by the terms of the following claims.

I claim:

1. A system for separating out impurities from a liquid comprising:
    a distiller for distilling said liquid to convert it to vapor;
    a container,
    said vapor being fed to the bottom portion of said container;
    an array of semi-permeable screens rotatably mounted in said container;
    means for rotating said screens at a speed of 3000–10,000 rpm to generate vertical spiral vortexes which act on said vapor and add a high level of kinetic energy to separate out impurities therefrom; and
    a condenser, said vapor being fed from said container to said condenser to convert said vapor back to a liquid state.

2. The system of claim 1 and further including a second container, an array of semi-permeable screens rotatably mounted in said second container, means for rotatably driving said screens in said second chamber at a speed of 6000–100,000 rpm, said vapor being fed from said first mentioned container to the bottom of said second container, high level centrifugal forces having high level horizontal vectors being generated in said second container by said rotating screens which separate out molecular species in the vapor, the purified vapor output of said second container beng fed to said condenser for conversion to liquid form.

3. The system of claim 1 wherein the means for driving each of said screen arrays comprises a separate motor and a shaft running between said motor and the screens of each of said arrays.

4. The system of claim 1 wherein said screens have 4–10 mesh.

5. The system of claim 1 and further including means for recycling the elements separated from said vapor to the distiller.

6. A method for removing impurities from a liquid comprising the steps of:
    distilling said liquid to convert it to vapor;
    feeding said vapor to the bottom of a container having an array of rotatably mounted semi-permeable screens therein;
    driving said screens at a speed of 3,000–10,000 rpm to generate vertical spiral vortexes which act on said vapor and add a high level of kinetic energy to separate out impurities therefrom; and
    feeding the output of said container to a condenser to convert the vapor to liquid form.

7. The method of claim 6 wherein prior to being fed to said container said vapor is fed to a second container having an array of semi-permeable screens rotatably mounted therein;
    rotatably driving said screens at a speed of 6000–100,000 rpm to generate high centrifugal forces having high level horizontal vectors in said container which act to purify said vapor by separating out molecular species in said vapor; and
    feeding the purified vapor to a condenser for conversion to liquid form.

8. The method of claim 7 and further including the step of returning the impurities separated from said vapor to said distiller for recycling.

* * * * *